United States Patent
Donlan et al.

(10) Patent No.: US 9,753,807 B1
(45) Date of Patent: Sep. 5, 2017

(54) GENERATION AND VERIFICATION OF ERASURE ENCODED FRAGMENTS

(71) Applicant: Amazon Technologies, Inc., Reno, NV (US)

(72) Inventors: Bryan James Donlan, Seattle, WA (US); Matteo Frigo, Acton, MA (US); Colin Laird Lazier, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 231 days.

(21) Appl. No.: 14/307,313

(22) Filed: Jun. 17, 2014

(51) Int. Cl.
G06F 17/30 (2006.01)
G06F 11/14 (2006.01)
G06F 11/10 (2006.01)

(52) U.S. Cl.
CPC ...... G06F 11/1435 (2013.01); G06F 11/1076 (2013.01); G06F 17/30206 (2013.01); G06F 17/30067 (2013.01); G06F 17/30233 (2013.01); G06F 17/30516 (2013.01)

(58) Field of Classification Search
CPC .............. H03M 13/373; G06F 11/1076; G06F 11/1048; G06F 11/1092; G06F 11/14; G06F 3/0619; G06F 11/08; G06F 11/0751; G06F 11/1016; G06F 11/1096; G06F 11/1662; G06F 11/2094; G06F 17/30; G06F 17/30233; G06F 17/30902
USPC ........ 707/695, 693, 770, 812; 714/755, 758, 714/768
See application file for complete search history.

(56) References Cited

U.S. PATENT DOCUMENTS

| | | | |
|---|---|---|---|
| 6,738,380 B1 | 5/2004 | Imai et al. | |
| 7,581,156 B2 | 8/2009 | Manasse | |
| 7,734,643 B1 * | 6/2010 | Waterhouse | G06F 17/30067 707/770 |
| 8,250,433 B2 | 8/2012 | Wylie et al. | |
| 8,418,029 B2 | 4/2013 | Daikokuya | |
| 8,429,503 B2 * | 4/2013 | Okamura | H03M 13/1102 714/776 |

(Continued)

OTHER PUBLICATIONS

U.S. Appl. No. 13/925,497, filed Jun. 24, 2013, Franklin et al.
(Continued)

*Primary Examiner* — Dangelino Gortayo
(74) *Attorney, Agent, or Firm* — Lee & Hayes, PLLC; Charles L. Warner

(57) ABSTRACT

Erasure encoded fragments are generated by an erasure encoding scheme, represented by an erasure encoding matrix, operating on a data file. A new erasure encoded fragment may be generated from previously-generated erasure encoded fragments without reconstructing the original data file. Available and valid erasure encoded fragments are identified and a set of those fragments is selected. A composite encoding matrix is generated based upon the selected fragments and the fragment specified to be generated. The composite matrix is applied to the selected fragments to produce a plurality of partial sums. The partial sums are then combined to generate the specified fragment. The partial sums may be produced by different devices so as to distribute the computational workload and/or to reduce network traffic. The integrity of a generated fragment may be verified by generating the specified fragment twice, using two different sets of fragments, and then comparing the two results.

42 Claims, 6 Drawing Sheets

(56) References Cited

U.S. PATENT DOCUMENTS

| | | | |
|---|---|---|---|
| 8,473,778 B2 | 6/2013 | Simitci et al. | |
| 8,504,535 B1 | 8/2013 | He et al. | |
| 8,522,109 B2 | 8/2013 | Murakami et al. | |
| 8,683,296 B2* | 3/2014 | Anderson | H03M 13/134 714/6.24 |
| 8,706,980 B2* | 4/2014 | Dhuse | G06F 11/1076 711/154 |
| 8,751,894 B2* | 6/2014 | Grube | G06F 17/30516 714/755 |
| 8,769,370 B2* | 7/2014 | Murakami | H03M 13/1154 714/701 |
| 8,806,296 B1 | 8/2014 | Lazier | |
| 8,850,288 B1 | 9/2014 | Lazier et al. | |
| 8,869,001 B1 | 10/2014 | Lazier | |
| 8,928,503 B2* | 1/2015 | Oggier | H03M 13/373 341/51 |
| 9,026,867 B1 | 5/2015 | Northcott et al. | |
| 9,047,310 B2* | 6/2015 | Li | G06F 17/30206 |
| 9,098,446 B1 | 8/2015 | Donlan et al. | |
| 9,098,447 B1 | 8/2015 | Donlan et al. | |
| 9,158,927 B1 | 10/2015 | Franklin et al. | |
| 9,229,810 B2* | 1/2016 | He | G06F 11/1076 |
| 2004/0078746 A1 | 4/2004 | Tanaka et al. | |
| 2004/0117718 A1 | 6/2004 | Manasse | |
| 2004/0225946 A1 | 11/2004 | Hashimoto et al. | |
| 2006/0080574 A1 | 4/2006 | Saito et al. | |
| 2006/0155946 A1 | 7/2006 | Ji | |
| 2006/0184857 A1 | 8/2006 | Takagi et al. | |
| 2006/0212782 A1 | 9/2006 | Li | |
| 2007/0011582 A1 | 1/2007 | Moriyama et al. | |
| 2007/0177739 A1* | 8/2007 | Ganguly | H04L 63/0428 380/277 |
| 2008/0221856 A1 | 9/2008 | Dubnicki et al. | |
| 2009/0222585 A1 | 9/2009 | Khalil et al. | |
| 2010/0083068 A1 | 4/2010 | Wylie et al. | |
| 2010/0094986 A1 | 4/2010 | Zuckerman et al. | |
| 2010/0095012 A1 | 4/2010 | Zuckerman et al. | |
| 2010/0095184 A1* | 4/2010 | Zuckerman | H04L 67/1008 714/751 |
| 2010/0100587 A1 | 4/2010 | Teglovic et al. | |
| 2010/0174968 A1 | 7/2010 | Charles et al. | |
| 2011/0029711 A1 | 2/2011 | Dhuse et al. | |
| 2011/0029742 A1 | 2/2011 | Grube et al. | |
| 2011/0029809 A1 | 2/2011 | Dhuse et al. | |
| 2011/0087948 A1 | 4/2011 | Murakami et al. | |
| 2011/0197106 A1 | 8/2011 | Kishigami et al. | |
| 2012/0278679 A1 | 11/2012 | Rub et al. | |
| 2013/0061116 A1 | 3/2013 | Grube et al. | |
| 2013/0173956 A1 | 7/2013 | Anderson | |
| 2013/0204849 A1 | 8/2013 | Chacko | |
| 2014/0129904 A1 | 5/2014 | Sakai et al. | |
| 2014/0344531 A1 | 11/2014 | Lazier | |
| 2015/0229329 A1* | 8/2015 | Yamada | H03M 7/6023 714/759 |
| 2015/0378820 A1 | 12/2015 | Doerner | |
| 2016/0013815 A1 | 1/2016 | Wideman et al. | |

OTHER PUBLICATIONS

Office actin for U.S. Appl. No. 14/500,576, mailed on Mar. 10, 2016, Frankilin et al., "Verification of Erasure Encoded Fragments", 9 pages.

U.S. Appl. No. 13/898,066, filed May 20, 2013, Donlan et al.
U.S. Appl. No. 13/898,071, filed May 20, 2013, Donlan et al.
U.S. Appl. No. 14/274,218, filed May 9, 2014, Donlan.
Huang, C. et al., "Erasure Coding in Windows Azure Storage", Microsoft Corporation [online][retrieved on: May 22, 2013] retrieved from: http://research.microsoft.com/pubs/179583/LRC12-cheng%20webpage.pdf, 12 pps.
Weatherspoon, H. et al., "Erasure Coding vs. Replication: A Quantitative Comparison", Computer Science Division, University of California, Berkeley [online][retrieved on: May 22, 2013] retrieved from: http://www.cs.rice.edu/Conferences/IPTPS02/170.pdf, 6 pps.
Hendricks, J. et al., "Verifying Distributed Erasure-Coded Data", PODS 2007, Aug. 12-15, 2007, Portland, Oregon, US [online][retrieved on: May 22, 2013] retrieved from: http://www.pdl.cmu.edu/PDL-FTP/SelfStar/podc07.pdf, 8 pps.
Courtade et al., "Optimal Allocation of Redundancy Between Paket-Level Erasure Coding and Physical-Layer Channel Coding in Fading Channels", IEEE Transactions on Communications, vol. 59, No. 8, Aug. 2011, pp. 2101-2109.
Fan, "Network Coding based Information Security in Multi-hop Wireless Networks", Thesis paper presented to the University of Waterloo for fulfillment for the degree of Doctor of Philisophy in Electrical and Computer Engineering, Waterloo, Ontario, Canada, 2010, 110 pages.
Lacan et al., "Systematic MDS Erasure Codes Based on Vandermonde Matrices", IEEE Communications Letters, vol. 8, No. 9, Sep. 2004, pp. 570-572.
Normand et al., "Erasure Coding with the Finite Radon Transform", IEEE Proceedings of the 2010 WCNC, Apr. 2010, 6 pages.
Office action for U.S. Appl. No. 14/274,218 mailed on Feb. 10, 2016, Donlan, "File Recovery Using Diverse Erasure Encoded Fragments", 9 pages.
Phutathum, "Implementing Distributed Storage Systems by Network Coding and Considering Complexity of Decoding", KTH Electrical Engineering Master's Degree Project, Stockholm, Sweden, Aug. 2012, 58 pages.
Sunitha et al., "Ensureing Availability and Integrity of Data Storage in Cloud Computing", Paripex—Indian Journal of Research, vol. 2, Issue 2, Feb. 2013, pp. 119-122.
Tang et al., "A Sub-Matrix Method of Mulitple Reed-Solomon Erasure Coding", AusCTW 2007, Feb. 2007, pp. 166-170.
Hendricks, Efficient Bysantine Fault Tolerance for Scalable Storage and Services, Jul. 2009, School of ComputerScience Carnegie Mellon University Pittsburgh, PA 15213, pp. v., 1-111.
Luo et al. "An Efficient XOR-Scheduling Algorithm for Erasure Codes Encoding", Publisher: IEEE, published in Dependable Systems & Networks, 2009, IEEE/IFIP Int'l Conference, Lisbon, Jun. 29, 2009-Jul. 2, 2009, pp. 504-513.
Nychis et al., Analysis of Erasure Coding in a Peer to Peer Backup System, May 2006, Carnegie Mellon University, pp. 1-13.
Office action for U.S. Appl. No. 13/898,071, mailed on Dec. 17, 2014, Donlan et al., "Recovery of Corrupted Erasure-Coded Data Files", 10 pages.
Office action for U.S. Appl. No. 13/898,066, mailed on Dec. 18, 2014, Donlan et al., "Recovery of Corrupted Erasure-Coded Data Files", 10 pages.
Office action for U.S. Appl. No. 13/925,497, mailed on Dec. 19, 2014, Franklin et al., "Cross-Region Recovery of Encrypted, Erasure-Encoded Data", 14 pages.
Office action for U.S. Appl. No. 14/500,582, mailed on Apr. 21, 2016, Frankilin et al., "Verification of Erasure Encoded Fragments", 21 pages.

* cited by examiner

GENERATION AND VERIFICATION OF ERASURE ENCODED FRAGMENTS

BACKGROUND

In a data storage system using erasure encoding, it may be desired or necessary to generate new erasure encoded fragments, such as to reconstruct lost or damaged fragments or to add fragments. This process typically requires transferring at least some number of valid fragments over a network to a single point. These transferred fragments can then be utilized in order to rebuild an original file, which can then be used to reconstruct lost or damaged fragments, and/or generate new fragments. This can be a computationally complex and challenging problem, and transferring large numbers of fragments over the network can burden the network. It may also be desirable to verify the new fragments.

It is with respect to these and other considerations that the disclosure presented herein has been made.

DETAILED DESCRIPTION

The following Detailed Description is directed to technologies for efficient generation and verification of new erasure encoded fragments. Generally stated, in an erasure encoding scheme which can be represented as an erasure encoding matrix, the erasure encoded fragments are generated by applying an erasure encoding matrix to the data file. Erasure encoding therefore generates a mathematical construct of n fragments for an original data file. When reconstruction of the original data file is desired, only m non-identical valid fragments of the n erasure encoded fragments are required to accurately reconstruct the original data file. The n fragments may be periodically checked to assure their integrity. A fragment may be lost or corrupted, however, due to, for example, failure of a disk drive on which the fragment was stored. It may also happen that, for some reason, it is desired to create one or more additional fragments. It may therefore be desirable to reconstruct a lost fragment, replace a lost fragment with a different fragment, and/or add one or more different fragments, for example, to ensure that there are always sufficient fragments available to reconstruct the original data file. This can be done by retrieving at least some of the remaining fragments, transferring them over a network to a single point, and then reconstructing the original data file. Erasure encoded fragments may be re-generated, and then the lost or corrupted erasure encoded fragment can be replaced and/or a new fragment stored. The process of transferring numerous original fragments, however, can burden a communications network. Further, the process of reconstructing the original data file and generating new erasure encoded fragments therefrom can burden a server.

A process is discussed below to generate a fragment, such as a lost or damaged fragment, a new fragment, or an additional fragment. This process does not require reconstruction of the original data file. For convenience of discussion, a reconstructed fragment (identical to the original fragment), a replacement fragment (to replace the original fragment, but not with an identical fragment), and an additional fragment (e.g., to supplement the number of available fragments), may be referred to herein either as a "new" fragment or a "specified" fragment.

Further, as the original data file is not reconstructed in order to generate a new fragment, conventional verification techniques, such as verifying the checksum of the reconstructed data file, may not be useful. Therefore, a process for verification of a newly-generated fragment is also discussed below.

Figure 1:
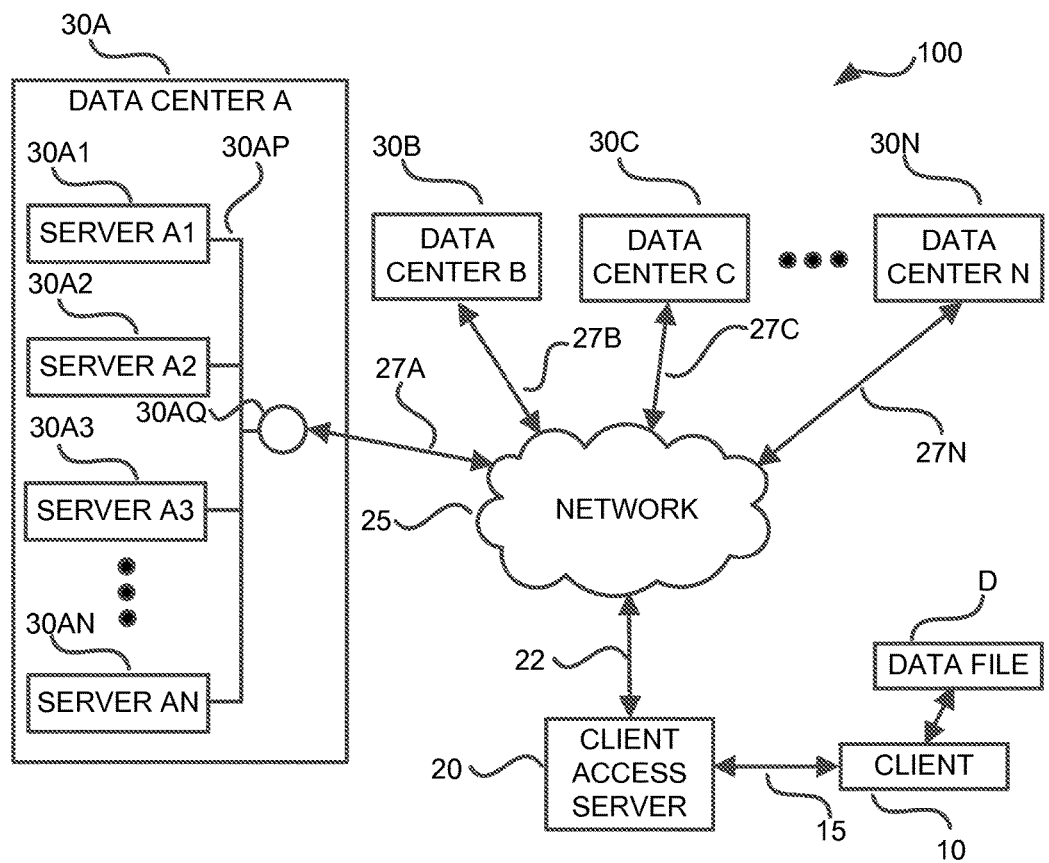
FIG. 1 is an illustration of an exemplary distributed computing system that can receive, erasure encode, store, recover, decode/reconstruct, and send files.

FIG. 1 is an illustration of an exemplary distributed computing system 100 that can receive a data file, erasure encode the data file, store and recover erasure encoded fragments from the data file, decode/reconstruct the data file from erasure-encoded fragments, and send the data file. In the example system 100 shown in FIG. 1, a client has a data file D that the client wishes to have backed up at a location other than at the client site. In order to accomplish this, a client computer 10 connects with a client access server 20, client access gateway, or client access portal via a connection 15, and sends the data file D to the client access server 20. Typically, a client might send multiple data files to the client access server 20 for storage. The connection 15 may be any desired connection or connections that provide the desired security, data speed, cost of service, etc., such as, but not limited to, the Internet.

In response to receiving a data file D, the client access server 20 erasure encodes the data file using, for example, an m-of-n system, such as Reed-Solomon or other deterministic maximum-distance-separable erasure code, and distributes at least m of the n fragments over a connection 22 and a network 25 to a multitude of data centers 30A-30N for storage (collectively the data centers 30, or individually a data center 30, as the context may require). The network 25 is preferably a secure, internal data network but can be the Internet or any desired connection or connections that provide the desired security, data speed, cost of service, etc. The connection 15 and the network 25 may be the same or may share one or more connections. Each data center 30A-30N is connected to the network 25 by a respective connection 27A-27N.

There could be only two data centers 30 with each data center storing m of the n fragments, n data centers with each data center storing one of the n fragments, more than n data centers with some of the fragments being duplicated across two or more data centers, or even k data centers with each data center storing n/k fragments, where n/k is not less than n-m. Each data center 30 preferably has one or more data servers, sometimes conventionally referred to a "nodes". For example, data center 30A may have a plurality of data servers A1-AN (30A1-30AN). These data servers 30A1-30AN are connected by a data center internal network 30AP to data center local network hub 30AQ, which is connected to the network 25. Thus, the n fragments may be distributed across one or more data servers in one or more data centers.

Suppose now that the client computer 10 suffers a hard drive failure, from which the data file cannot be recovered, or suffers from some other event that destroys the data file on the client computer 10. The client will then use a client computer 10 (or even a new or replacement computer) to request that the client access server 20 retrieve and provide those stored data files to the client computer 10. For each data file, the client access server 20 will then request that the various data centers 30 reconstruct the data file(s) and provide the data file(s) to the client access server 20, or provide the erasure encoded fragments for the data file(s) to the client access server 20, in which case the client access server 20 may then use the fragments to reconstruct the data file(s). The client access server 20 will then send the reconstructed data file(s) to the client computer 10. Data file reconstruction may be performed by the client access server 20, by any one or more of the servers in the data centers 30A-30N, by the client computer 10, or by another computing device or devices.

During the process of reconstruction of the data file, or during a random check, periodic check, scheduled check, etc., of the data stored on a data server in a data center, it may be found that one or more fragments have become lost or corrupted due to, by way of example, a disk drive failure or error or some sort. When that occurs, it is desirable to recreate and replace that lost or corrupted fragment to ensure that, should another fragment or fragments become corrupted, there are still enough valid fragments to reconstruct the data file D.

Also, a lost or damaged fragment need not be replaced with an identical originally-generated fragment. For example, if originally-generated fragment #24 is damaged, it does not have to be replaced by a newly-generated fragment #24 which is identical to the originally-generated fragment #24. Instead, fragment #24 may be replaced by a newly-generated fragment which has not been previously stored. That is, a new fragment #36 may be generated and stored in the place of the lost or damaged fragment #24, and then links or references to fragment #24 are removed or deleted.

Even though the most frequent use of the process presented herein may be to reconstruct a lost or damaged fragment, generation of a completely new fragment is also contemplated. For example, it may be found that the original fragment storage scheme only stored m+10 of the fragments and it is now desired, for higher reliability, to store m+20 fragments. The additional fragments may be newly generated and stored.

Therefore, any reference herein to reconstructing a lost or damaged fragment should be understood to also include newly generating a non-identical fragment to replace the lost or damaged fragment and to newly generating a non-identical fragment to increase the number of stored fragments.

Assume, for example, that there are several fragments in the data servers 30A1-30AN, and several fragments in the data servers in each of the data centers 30B-30N. Also assume that the client access server 20 is responsible for generating the replacement fragment (that assumption is for convenience of discussion as any data server in any data center could have that responsibility). Each of data servers 30A1-30AN will send fragments via the data center connection 27A and network 25 to the client access server 20. Data servers (not shown) in the other data centers will similarly send fragments via their respective connections 27B-27N and the network 25 to the client access server 20. Thus, the connections 22 and 27A-27N and the network 25 are handling their normal traffic as well as the additional traffic caused by the transfer of multiple fragments from one server to another so that a lost or corrupted fragment can be replaced. Consequently, the connections 22 and 27A-27N and the network 25 may become "choke points" or "bottlenecks" for network traffic. This can delay replacement of the missing or corrupt file as well as delay the servicing needs of other clients of the system 100. Further, the tasks of reconstructing the original data file from the collected fragments and then generating new fragments can place an additional computational burden on an already-busy server.

Figure 2:
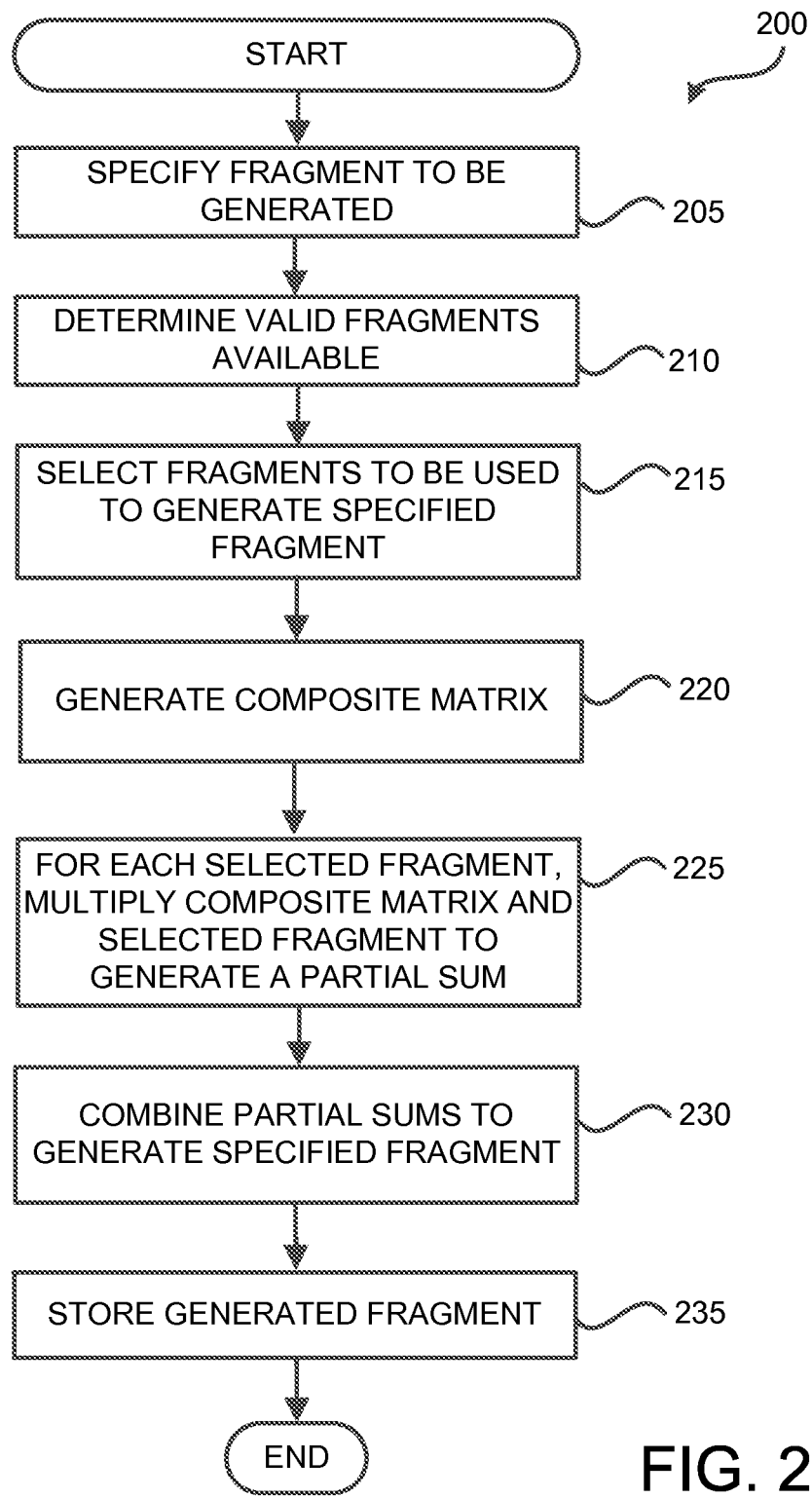
FIG. 2 is a flow diagram showing a general illustrative routine for generating a new erasure encoded fragment.

FIG. 2 is a flow diagram showing a general illustrative routine 200 for generating a new erasure encoded fragment. As disclosed herein, a specified fragment can be generated from other fragments related to an erasure encoding scheme and a data file without recourse to the data file or a reconstruction of the data file. The term "related to" is to indicate that fragments may have been previously generated by applying the erasure encoding scheme to the data file, previously generated by using the process described herein, and/or generated by some other technique. The fragments to be used may have been generated using by using only a single technique, or by more than one technique. For example, some of the fragments to be used may have been generated by applying the erasure encoding scheme to an original or reconstructed data file, and others of the fragments to be used may have been generated by the process described herein. Further, the computational workload may be distributed among and performed by one or more servers.

In the routine 200, the fragment to be generated is specified 205 based upon, for example but not limited to, any of the considerations discussed above. The valid fragments available from the one or more servers are then determined 210. The fragments which are to be used to generate the specified fragment are selected 215, that is, of the valid fragments previously generated by the erasure encoding scheme, stored, and available, the fragments to be used to generate the new fragment are selected. A composite matrix is generated 220 based upon the erasure encoding scheme, the selected fragments, and the specified fragment. The composite matrix may be generated by one server and sent to other servers, or each server may be responsible for generating its own composite matrix. Each server generating a composite matrix uses the same information: (a) an identification of the fragments which will be used to generate the new fragment, this is used to generate a collect-fragment specific matrix which will then be inverted, this matrix is one that would be used if it were desired to generate only those particular fragments directly from the original or reconstructed data file; (b) an identification of the fragment to be generated, this is used to generate the desired-fragment specific matrix, this matrix is one that would be used if it were desired to generate the specified new fragment directly from the original or reconstructed data file, this matrix will then be multiplied with the inverted matrix to produce the composite matrix; and (c) an identification of which fragments the server should use to generate a partial sum, this is used to generate a collected fragment matrix, which will then be multiplied with the composite matrix to produce the partial sum for that server.

For each selected fragment, the composite matrix and the selected fragment are multiplied 225 to produce a partial sum, the plurality of selected fragments thereby producing a plurality of partial sums. The partial sums may be generated by multiple servers or may be generated by a single server. One or more of these partial sums may be sent to any available server for the next operation. These partial sums are then combined 230, such as by adding, to generate the specified fragment. The generated specified fragment is then stored 235. The generated fragment may be stored at the server which generated the fragment, and/or may be sent to one or more other servers for storage.

Two or more of these partial sums may be combined to produce a first intermediate sum, which may be sent to an available server for the next operation, which may combine this first intermediate sum with other partial sums or other intermediate sums to produce a second intermediate sum, which may be sent to an available server for the next operation, which may combine this second intermediate sum with other partial sums or other intermediate sums to produce a third intermediate sum, and so on. Once all of the partial sums and any intermediate sums have been combined, then the generated result is the specified fragment. Also, two or more of these partial sums may be combined to produce a first intermediate sum, and a different two or more of these partial sums may be combined to produce a second intermediate sum, and so on. Once all of the partial sums and any intermediate sums have been combined, then the generated result is the specified fragment. Thus, the partial sums may be combined in one operation or even in multiple tiers of operation to generate the specified fragment.

In addition, a server may, instead of performing partial sums on the fragment or fragments that it has, may simply send that fragment or those fragments to another server, which can generate the partials sums for those fragments and combine those partial sums with partial sums that it has generated from its own fragments, with partial sums that it has received from other servers, and/or with partial sums that it has received from other data centers. The resulting sum may be a partial sum which is then provided to another server, or may be the specified fragment if there are no other partial sums to be used.

The new fragment has therefore been generated without first reconstructing the original data file D. Each server may be tasked with producing only one partial sum, thereby distributing the computational workload. Any desired and available server may be tasked with combining the partial sums, such as by adding them. It should be noted that the results of several selected fragments may be included in a single partial sum. For example, if a server has five fragments, it will still, preferably although not necessarily, produce only a single partial sum representing the results of all five of those fragments. The various options discussed herein therefore reduce network traffic and/or reduce or redistribute the computational workload among the various servers.

A better understanding of this process and the options provided thereby may be obtained by considering the equations and discussion below. Erasure encoded fragments F are generated, for example, by applying a desired erasure encoding scheme, represented herein as an encoding matrix E, to the data file D.

$$[F]=[E]\times[D] \qquad (1)$$

To reconstruct the data file, at least m-of-n valid fragments are recovered and identified, represented as [FR], and the rows of the encoding matrix E which would have been responsible for generating those fragments are used to form a reduced encoding matrix [ER]. It will therefore be seen that $$[FR]=[ER]\times[D] \qquad (2)$$

If the fragments are selected so that [ER] is a square, invertible matrix, then $$[D]=[ER]^{-1}\times[FR] \qquad (3)$$

Furthermore, in order to generate a new fragment FS, it is not necessary to apply the full erasure encoding matrix E to the data file. Rather, the new fragment FS can be generated by applying a fragment-specific matrix [ES] to the data file D. The fragment specific matrix may be the erasure encoding matrix E with all rows being zero except for the row which generates that specific fragment. Thus, $$FS=[ES]\times[D] \qquad (4)$$

Now, substituting D from equation (3) into D for equation (4), the result is:

$$FS=[ES]\times[ER]^{-1}\times[FR] \qquad (5)$$

Thus, the new fragment can be directly generated from the recovered fragments.

It should be noted, however, that matrix operations are associative, so $$FS=([ES]\times[ER]^{-1})\times[FR] \qquad (6)$$

This can be expressed as $$FS=[EC]\times[FR] \qquad (7)$$

where the composite matrix EC is $$[EC]=([ES]\times[ER]^{-1}) \qquad (8)$$

It will also be noted that composite matrix EC may be considered to be a 1 row matrix, and FR may be considered to be a 1 column matrix. Thus, $$[EC]=[A_a\ A_b\ A_c\ A_n] \text{ and} \qquad (9)$$

$$[FR] = \begin{bmatrix} F_a \\ F_b \\ F_c \\ F_n \end{bmatrix} \qquad (10)$$

where the subscripts a, b, c, n correspond to the identification of the recovered fragment to be used in the generation of a new fragment FS.

FS may therefore be rewritten as the sum of a set of partial products $$FS=A_aF_a+A_bF_b+A_cF_c+A_dF_d=A_eF_e+\ldots A_nF_n \qquad (11)$$

which can also be expressed as $$FS=(A_aF_a+A_bF_b+A_cF_c)+A_dF_d+(A_eF_e+\ldots A_nF_n) \qquad (12)$$

or $$FS=\{[EC_{a\text{-}c}]\times[FR_{a\text{-}c}]\}+\{[EC_d]\times[FR_d]\}+\{[EC_{e\text{-}n}]\times[FR_{e\text{-}n}]\} \qquad (13)$$

where $[EC_{a\text{-}c}]$ is the composite matrix for fragments a-c, $[FR_{a\text{-}c}]$ is the matrix for fragments a-c, and so forth.

Thus, operations may be performed on the fragments located at a particular data server or data center to generate a partial sum, and the partial sum(s) resulting from such processing may be sent to another data server or data center for further processing. For example, rather than sending recovered fragments $F_a$, $F_b$, and $F_c$ individually across the network, only the resulting partial sum $(A_aF_a+A_bF_b+A_cF_c)$ is sent across the network. Likewise, rather than sending recovered fragments $F_e\ldots F_n$ individually across the network, only the resulting sum $(A_eF_e+\ldots A_nF_n)$ is sent across the network.

If the encoding scheme used is an exclusive-OR (XOR) or other type of finite-field (Galois field) type operation, then the size of the result of a summing operation is the same as the size of the original fragment. That is, if $F_a$, $F_b$, and $F_c$ are each, for example, K bytes, then the result, $(A_aF_a+A_bF_b+A_cF_c=A_aF_a \text{ ED } A_bF_b \text{ ED } A_cF_c)$, is also K bytes. This can result in a substantial savings in network traffic.

For example, assume that there are 25 fragments which have been recovered, and that these 25 fragments would be adequate to reconstruct the data file D. Also assume that fragments $F_a$, $F_b$, and $F_c$ are located at a first data center, for example, data center 30A, that fragment $F_d$ is located at a second data center, for example, data center 30B, and that fragments $F_e \ldots F_n$ are located at a third data center, for example, data center 30C. Also assume that, for some reason, such as a smaller processing workload, data center 30B is assigned the task of generating a new fragment. In a typical data file reconstruction process, 24 fragments would have to be transferred from data centers 30A and 30C to data center 30B—3 fragments from data center 30A and 21 fragments from data center 30B—thus consuming valuable network resources. In addition, data center 30B would be tasked with reconstructing the original data file.

By processing the recovered fragments at their respective data servers or data centers, however, the network traffic can be substantially reduced and/or the computational workload distributed. In this case, for example, data center 30A will send a partial sum, the sum of the partial products $A_aF_a$, $A_bF_b$, and $A_cF_c$, across the network to data center 30B. Similarly, data center 30C will send a partial sum, the sum of the partial products $A_eF_e, \ldots A_nF_n$, across the network to data center 30B. Thus, rather than 24 fragment-size packets of data being sent across the network, only two fragment-size packets, the two partial sums, are sent, thus saving the transmission of 22 fragment-size packets of data. Data center 30B will then combine the partial sums from data centers 30A and 30C with any partial sum(s) produced by its own recovered fragment(s) to generate the new fragment. The computational requirements are also spread, with different servers computing their respective partial sums, so that the computational burden on data center 30B is reduced. Data center 30B can then store that new fragment, such as in a data server 30A2, or send that new fragment to a different data center to store, or both.

The actual network traffic savings will depend on the number of fragments actually located in a data server or data center, and which server is the recipient of the processed fragments. For example, if in the above example, a server in data center 30C was assigned the task of generating the replacement fragment, then data center 30A would still be sending one sum, $(A_aF_a+A_bF_b+A_cF_c)$, rather than three fragments, across the network to data center 30C, resulting in a savings of two fragment-size data packets. Data center 30B, however, had only one packet, $F_d$, to transfer across the network to data center 30C, so it transfers $A_dF_d$ across the network, which is the same packet size, thereby resulting in no savings. Thus, rather than four fragment-size packets of data being sent across the network, only two fragment-size packets have to be sent, which is a savings of two fragment-size packets of data. This is a lesser savings than in the first example, but still a savings.

In one implementation, the task of generating a new fragment is assigned randomly among the data servers or the data centers. In another implementation, this task is assigned sequentially among the data servers or the data centers. In another implementation, this task is assigned based upon which data server or data center has the most available processing resources. In another implementation, this task is assigned based upon which data server or data center would require the least amount of data to be transferred across the network. In another implementation, a data server may be dedicated to this type of task.

As mentioned above, even though the erasure encoding scheme may have generated up to n packets, only m valid packets are needed to reconstruct the data file D. Those m fragments may be selected, and preferably are selected, based upon processing and combining as many fragments as possible at a data server or a data center before sending a sum over the network for generating a new fragment. For example, if data center 30A had fragments $F_a$, $F_b$, $F_d$, and $F_e$, data center 30B had fragments $F_a$, $F_b$, $F_c$, $F_d$, and $F_e$, data center 30C had fragments $F_c$ and $F_d$, data center 30D had fragment $F_a$, data center 30E had fragment $F_f$, and data center 30F had fragments $F_g$ through $F_m$, the fragments from data center 30B would be used in preference to the fragments in data centers 30A, 30C, 30D and 30E, as this would require transferring only one sum from data center 30B (representing fragments $F_a$, $F_b$, $F_c$ $F_d$, and $F_e$) rather than transferring four sums: one sum from data center 30A (representing fragments $F_a$, $F_b$, $F_d$, and $F_e$), one sum from data center 30C (representing fragments $F_c$ and $F_d$), one sum from data center 30D (representing fragment $F_a$), and one sum from data center 30E (representing fragment $F_f$). Therefore, the selection of fragments to be used, and which data centers provide the resulting fragment sums, may be based upon a consideration of how to reduce the network traffic and/or distribute the computational workload.

In addition, the entire fragment generation process may be performed by a single server if desired. For example, if all of the fragments to generate the desired fragment are readily available to a single server, then that server may perform all of the steps. The benefit would be that it is less computationally intensive to generate the new fragment directly from available fragments than to reconstruct the original data file and then erasure encode the reconstructed data file to generate the new fragment.

Also, if the fragments to generate the desired fragment are distributed among the various servers such that some of the servers can only contribute one fragment, then those servers may still send their fragment to a generating server, and the generating server may generate the partial sums. This may be less network intensive than sending the composite matrix across the network and receiving a partial sum in return. It does, however, plus a greater computational burden on the generating server.

Further, a lead server may generate the composite matrix and send it to one or more of the other servers for their use in generating partial sums, or the lead server may simply specify which fragment is to be generated, which fragments are to be used for the collected-fragment specific matrix, and which fragments are to be used by each other server to generate its partial sum, and that other server would generate its own composite matrix based upon that information. This may be useful where, for example, the lead server does not currently have the computational bandwidth to generate the composite matrix but the other servers do. Further, the lead server could also designate another server, having available computational bandwidth, to generate the composite matrix and send it to the other servers which will be generating the partial sums.

Figure 3A:
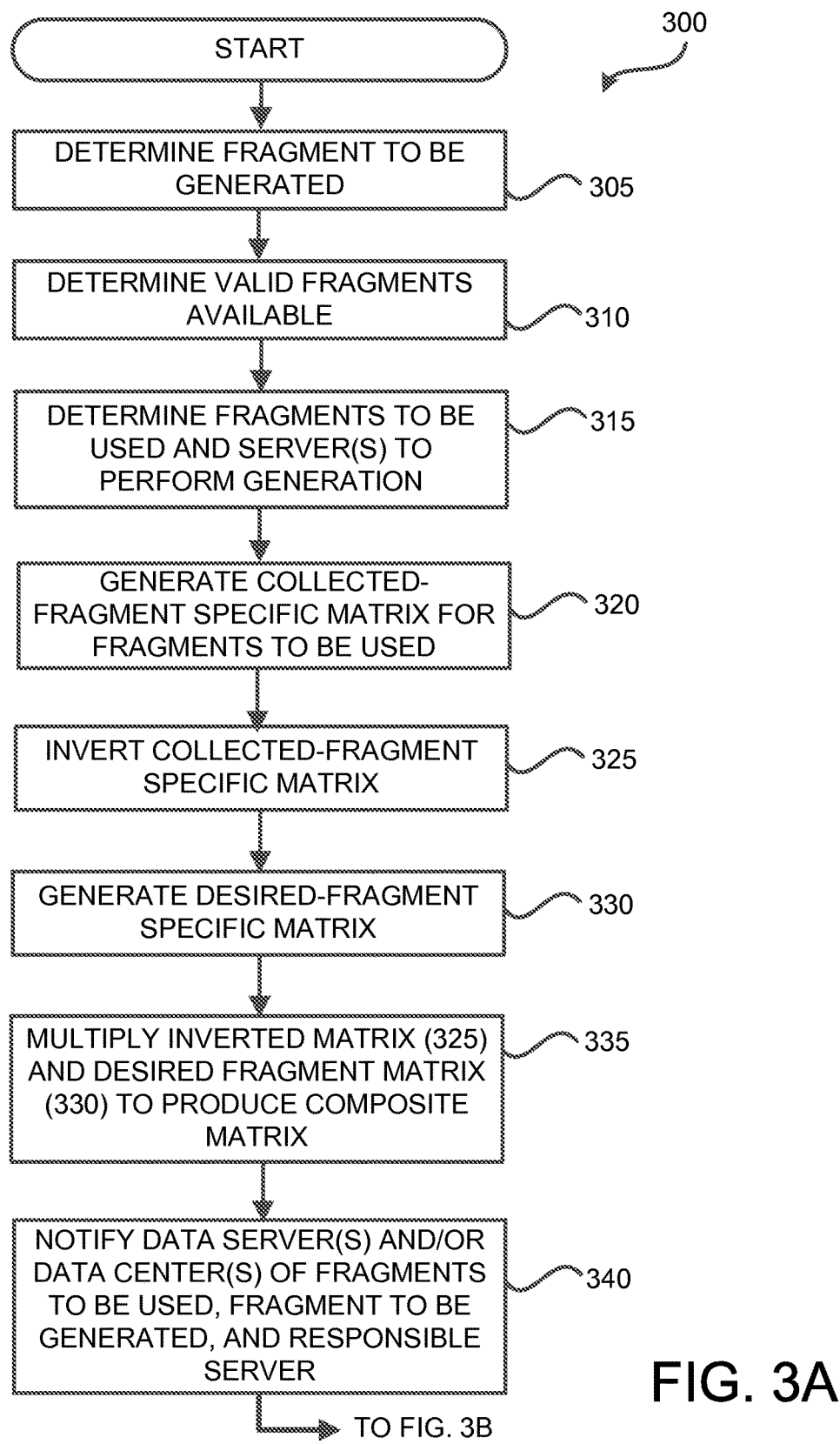
FIGS. 3A and 3B are flow diagrams showing a more specific illustrative routine for generating a new erasure encoded fragment.
Figure 3B:
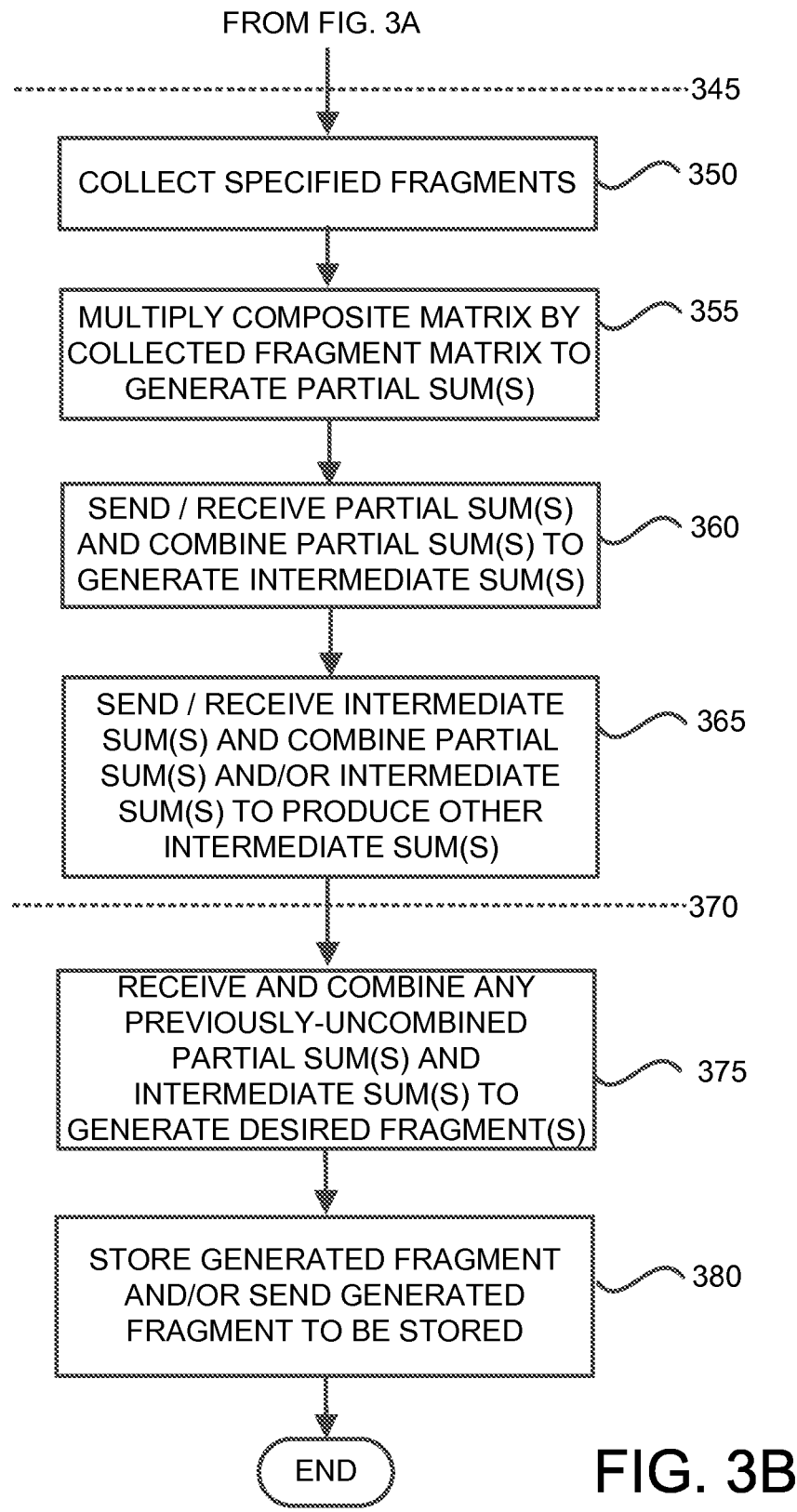

FIGS. 3A and 3B are flow diagrams showing a more specific illustrative routine 300 performed by a system 100 or components thereof, such as a client access server 30, a server 30A1-30AN in a data center 30A-30N, other computing device, or combination thereof, to generate a new erasure encoded fragment. For convenience of discussion, the device(s) performing the operation will be referred to as a server, such as a data server, a client access server, or some other computing device. Also, for convenience of discussion, a "lead" server may perform certain operations, and designate other servers to perform other operations. The designation of which server performs which operations may be changed as desired for a particular operating environment, such as for, but not limited to, the reasons discussed herein.

The routine 300 begins at operation 305, where a server detects a lost or damaged fragment, or a determination is made, possibly in response to a new system policy or possibly even by a human operator, that it is desired to have one or more additional fragments stored. As noted, this may be discovered during a check of file integrity or during an attempt to reconstruct a data file. A lead server such as, for example, server 30A1 in data center 30A, then determines, at operation 310, which fragments for the relevant data file are valid and available. This may be done by requesting the other servers to identify which fragments they have that are available and valid. At operation 315 the lead server determines which of those fragments are to be used to generate the new fragment, and which remote server(s) is(are) to generate the new fragment. Determining which fragments are to be used, and which server(s) is(are) to generate the new fragment, may be based, for example, on the factors and considerations discussed herein. In operation 320 the lead server then generates the collected-fragment specific matrix for the fragments specified to be used to generate the new fragment. This collected-fragment specific matrix may be, for example, the encoding matrix [ER] of equation (2) that would be used to operate on a data file if it were desired to produce only those fragments from the data file. Then, in operation 325, the collected-fragment specific matrix is inverted.

In operation 330 the server generates the desired-fragment specific matrix. This desired-fragment specific matrix is an encoding matrix that would be used to operate on a data file if it were desired to produce only the new (desired) fragment (s) from the data file. At operation 335, the lead server multiplies the inverted matrix of operation 325 with the desired fragment matrix of operation 330 to produce a composite matrix, e.g., matrix [EC] of equation (8). At operation 340, the lead server sends the composite matrix to the other data server(s) and/or data centers, and notifies the other data server(s) and/or data center(s) of the new fragment to be generated, and the fragment(s) to be used in the generation of a partial sum by that server. Dashed line 345 is used to indicate that one or more different servers or devices may be performing operations 350-365.

The computational workload may be distributed as desired to in accordance with computational and/or network traffic considerations as described herein. Servers may therefore be designated to forward their fragment(s) to another server, to generate partial and/or intermediate sums(s) from fragment(s) and/or partial sum(s), and/or to forward their partial and/or intermediate sum(s) to another server(s). Thus, a multi-tier process and operation is provided. Each server designated to generate a partial sum then performs operations 350-355.

In operation 350 each designated server will collect the fragments specified to be used by it and generate a collected fragment matrix. In some cases, where a server is only designated to process one fragment, the collected fragment matrix may be a 1-by-1 matrix. If the lead server generated the composite matrix based upon all of the designated fragments then a server receiving the composite matrix from the lead server will reduce the size of the received composite matrix by removing rows from the matrix to generate a reduced composite matrix that only contains the matrix rows related to the designated fragments to be used by that particular server. For example, if [EC] was for fragments $F_a$, $F_b$, $F_c$, but the server was only tasked to perform operations using fragments $F_a$ and $F_c$, it would remove the row which would generate fragment $F_b$. Alternatively, zeroes may be inserted into the collected fragment matrix for the fragments which are not being used by that server, such as fragment $F_b$. In operation 355 each designated server will generate a partial sum by multiplying the (reduced) composite matrix by its collected fragment matrix, for example, $[EC_{a-c}]\times[FR_{a-c}]$. If multiple desired fragments are being generated, then operations 350-360 may be performed for each desired fragment.

In operation 360, a server may send its generated partial sum(s) to another server, and/or receive partial sums from other server(s). It may then combine partial sums to generate intermediate sums.

In operation 365 a server may send the intermediate sum(s) it has generated, receive intermediate sum(s) from other servers, combine partial sum(s) and/or intermediate sum(s) to produce other intermediate sum(s). Operation 365 may be repeated several times to create a tiered mode of operation such that one or more servers forward their partial and/or intermediate sum results to another server, which combines their results with any partial sums it has received or generated to produce another intermediate sum, forward that intermediate sum to a server which combines partial sums from other servers, intermediate sums from other servers, and/or with any partial sums it has generated to produce another intermediate sum, and so on.

Dashed line 370 is used to indicate that a different server or device, such as the lead server, may be performing the next set of operations. The lead server may also perform one or more of operations 350-365. In operation 375 the lead server, or other designated server, will receive any previously-uncombined partial sum(s) and/or intermediate sum(s) from the various other servers. This server will combine these partial sum(s) and/or intermediate sum(s) to generate the new fragment(s). Finally, in operation 380 the server will store the new fragment and/or send the new fragment to another server or data center for storage.

In another embodiment, the lead server does not send the entire composite matrix to each of the servers designated to generate a partial sum. Rather, the lead server will generate one or more server-specific composite matrices by removing columns from the matrix to generate a reduced composite matrix that only contains the matrix columns related to the designated fragments to be used by a particular server. The lead server will then send a server-specific (reduced) composite matrix to each particular server. Each receiving server may then multiply that received, server-specific composite matrix with the collected fragment matrix of that server to generate a partial sum.

In another embodiment, the lead server does not generate a composite matrix or server-specific composite matrices. Rather, after determining 315 the fragments to be used and the server(s) to generate the new fragment, the lead server then notifies the other data servers and/or the data centers as to the fragments to be used to generate the collected-fragment specific matrix, which fragment(s) are to be used by that particular data server or data center, which fragment is to be generated and, if generation is to be performed by a server other than the lead server, specify the server to which the partial sums should be sent. It will be recalled, as discussed above, that it may neither be necessary nor desirable to use every fragment locally available to a server. For example, if two servers have fragment $F_c$, for example, only one of them should perform the operations with respect to that fragment.

It will be appreciated from equation (13) that the task of combining sums is an associative process. Thus, for example, partial sums A, B and C may be combined as A+B+C, A+(B+C), (A+B)+C, B+(A+C), B+C+A, etc. Accordingly, the task of combining partial sums may be performed by a single server, or may be performed by multiple servers and in multiple tiers. For example, server 30A1 may send its partial sum to server 30A2. Server 30A2 may then combine its own partial sum and/or a partial sum from another server or another data center with the partial sum from server 30A1 to generate a first combined sum. Server 30A2 may then send that first combined sum to server 30A3. Server 30A3 may then combine its own partial sum and/or a partial sum or combined sum from another server or another data center with the first combined sum from server 30A2 to generate a second combined sum. Server 30A3 may then send that second combined sum to another server, such as server 30AN, etc. Server 30AN may then combine its own partial sum and/or a partial sum or combined sum from another server or another data center with the second combined sum from server 30A3 to generate a complete sum, that is, to generate the desired fragment. Thus, the task of combining partial sums to generate the desired fragment may be spread across servers in a data center, and across data centers in geographically-distant locations.

The process describe above may be expanded to generate multiple fragments at once rather than generating new fragments individually. This can be accomplished by generating a composite matrix with additional rows for the additional desired fragments. However, the size of the data to be transferred, that is, the partial sums, grows proportionally to the number of new fragments to be generated. For example, if a fragment has a size of, say, K bytes, then the partial sum for a desired fragment would also be K bytes. If, however, two new fragments are to be generated, then the partial sums to be transferred would then be 2×K bytes, and 3×K bytes if three fragments are to be generated, etc. As a result, at some point the network traffic may increase, rather than decrease, and might eventually involve more network traffic and processing power than simply reconstructing the entire data file. Therefore, consideration is preferably given to whether it is more efficient to generate a new fragment or fragments as described herein or whether it is more efficient to perform a standard data file reconstruction and generation of the desired packets therefrom.

Also, even though reduction of network traffic may be a benefit of using the process described above, the process may also be performed by a single device which has m valid fragments. The single device can identify the fragments to be used, generate the composite matrix, and multiply the composite matrix by the identified fragments to produce partial sums, and sum those partial sums to generate the new fragment.

Figure 4:
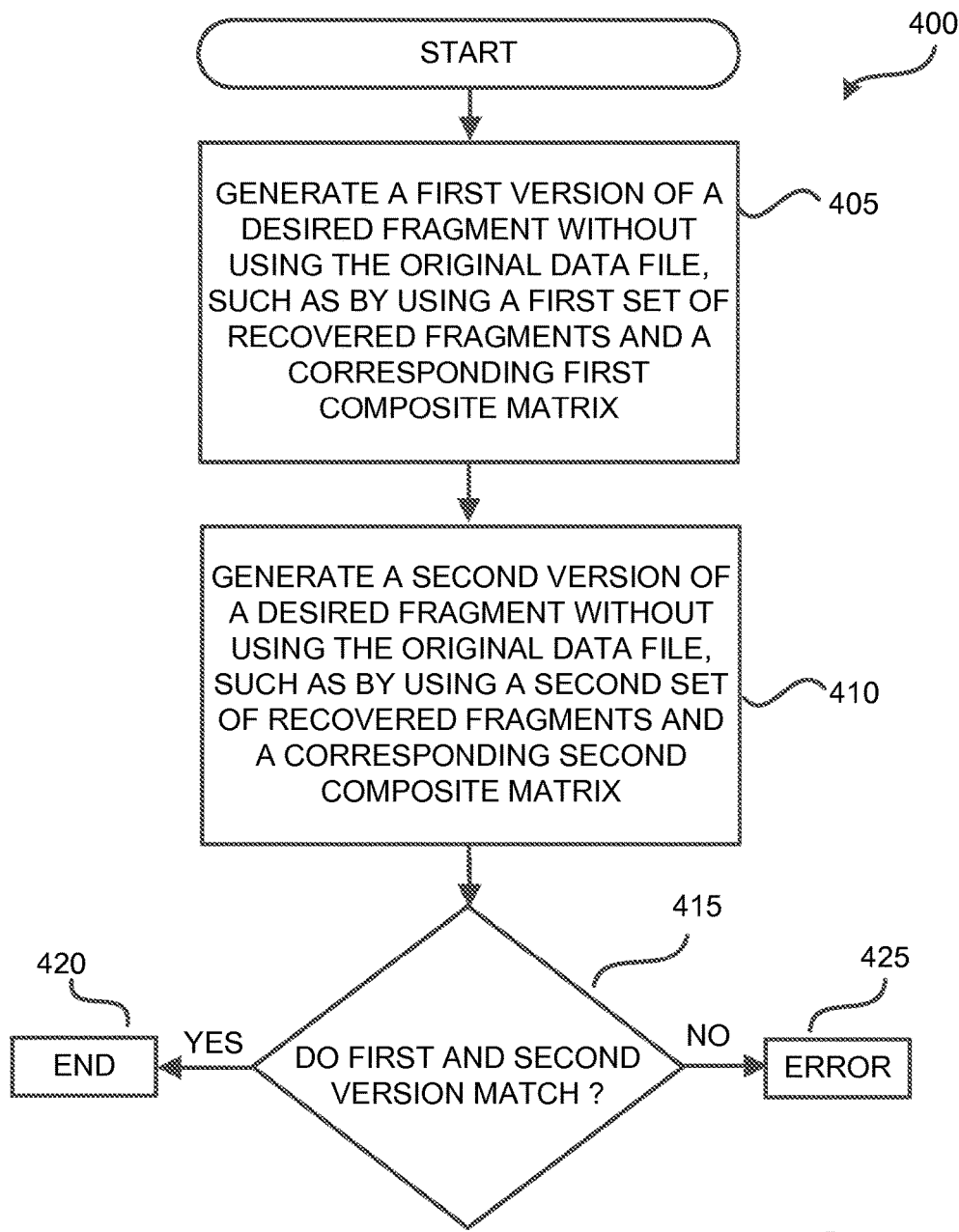
FIG. 4 is a flow diagram showing an illustrative routine for verifying the accuracy of a new erasure encoded fragment.

FIG. 4 is a flow diagram showing an illustrative routine 400 performed by a system 100 or component thereof, such as a client access server 20, a server 30A1-30AN in a data center 30A-30N, other computing device, or combination thereof, for verifying the accuracy of a new erasure encoded fragment. After generation of a fragment it may be desirable to verify that fragment. With traditional reconstruction techniques, wherein the complete data file is reconstructed and then the reconstructed data file is erasure-encoded again, an integrity check can be easily performed using a checksum of the reconstructed data file. The encoding host produces the new fragment from the reconstructed data file and then attempts to reconstruct the data file again using that new fragment in place of one of the other fragments. It then compares the checksums of the two reconstructed data files. If they do not match, then an error has occurred.

The traditional reconstruction technique described above, however, may require the type of the network traffic that the disclosed process seeks to avoid. The traditional checksum procedure might also be undesirable for use with the fragment generation process disclosed herein because the complete original data file is not reconstructed in order to generate a new fragment.

The main types of errors that may occur when attempting generation of a new fragment or reconstruction of a complete data file are: processor (computational) errors; corrupt partial sums (server specific results); and corrupt input fragments. Computational errors can be detected by performing the same computation two or more times on the same server, on two different servers, or at two different data centers, and comparing the results of the computations. Corrupt partial sums can be detected in the same manner as for computational errors, that is, generating a partial sum more than once and comparing them. A corrupted input fragment is ideally detected by performing a checksum, but if an input fragment is corrupt then the newly-generated fragment will be corrupt as well so the error will have to be identified by other techniques.

The problem described above may be avoided by generating the new fragment twice, using two almost-identical, but different, sets of selected fragments, that is, the sets preferably differ by only one fragment. Thus, if fragments $F_a$, $F_b$, $F_c$, $F_d$, $F_e$ and $F_f$ are selected to generate a desired fragment, then fragments $F_a$, $F_b$, $F_c$, $F_d$, $F_e$ and $F_h$, for example, are selected to again generate the desired fragment. If the resulting fragments are identical then they are probably correct. This method does, however, increase network traffic as two different partial sums are to be provided by one of the servers, one partial sum using one set of fragments, and another partial sum using another set of fragments which is different by, preferably, only one fragment.

Preferably, the fragment sets differ by only one fragment. If the fragment sets differ by two or more fragments then an error will still likely be detected with a high probability, but the probability will increase that the corruption in the fragments in one set may compensate for the corruption of the different fragments in the other set, and that the error will not be detected.

The routine 400 begins at operation 405, where a server generates a first version of a desired fragment without using the original data file, such as by using a first set of recovered fragments and a corresponding first composite matrix, as disclosed above. At operation 410, a server generates a second version of the desired fragment without using the original data file, such as by using a second set of recovered fragments and a corresponding second composite matrix.

The first and second versions of the desired fragment are preferably generated using different sets of selected recovered fragments along with corresponding composite matrices. A first set of recovered fragments will be identified and a corresponding first composite matrix will be generated, and these will be used to generate the first version of the desired fragment. A second set of recovered fragments will then be identified and a corresponding second composite matrix will be generated, and these will be used to generate the second version of the desired fragment. As mentioned above, the first set of recovered fragments and the second set of recovered fragments are almost identical, but are not identical, because they differ by at least one fragment, and preferably, but not necessarily, by only one fragment. The first and second composite matrices will be different because the fragments to be used with them are different (by at least one fragment).

At operation 415, a server compares the two versions. If they match, then the versions are most likely correct so the process ends at operation 420. If they do not match then an error has occurred and, at operation 425, an error is indicated, other procedures may be implemented to determine the source of the error, and/or an indication that an error has occurred may be communicated to another program or server. Thus, it is possible to verify a newly-generated desired fragment without having to first reconstruct the original data file.

The operations may be performed by one or more servers. For example, a single data server may generate both versions of the desired fragment and perform the comparison. In another embodiment, two different servers may generate the two different versions and one of them perform the comparison. In another embodiment, two different servers may generate the two different versions and a third server may perform the comparison. Also, an instructing or lead server may instruct certain other servers to perform certain of these operations. Thus, the network and computational burdens may be distributed as desired. Also, as discussed above, multiple servers may be tasked to generate the various composite matrices and/or partial and/or intermediate sums used to generate the desired fragment.

Also, the fragments selected and used to create the desired fragment may, or may not, have been created using the original data file. One or both of the fragments selected and used to create the desired fragment may have itself been created using this process. For example, if fragments A-F were created from the original data file, and some of these fragments were used to create a new fragment G, and the same or others of these fragments used to create a new fragment H, and so on, then one or more of the new fragments may be used to create the desired fragment. If there are sufficient new fragments, then the desired fragment may be created without even using the fragments originally created from the data file.

It should be appreciated that the logical operations described herein may be implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

Figure 5:
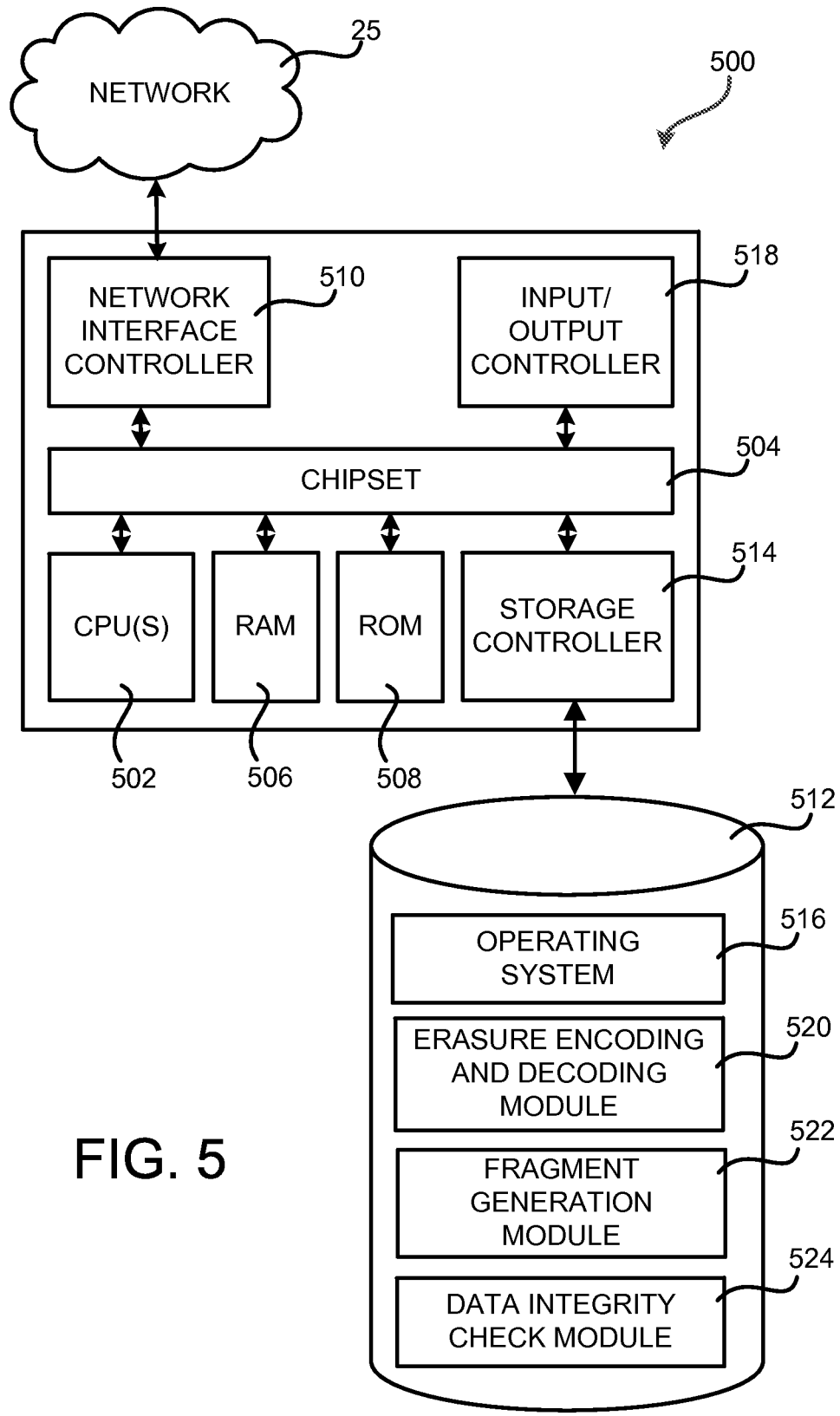
FIG. 5 is a computer architecture diagram showing an exemplary computer architecture for a device capable of performing the functionality disclosed herein for generating and/or verifying a new erasure encoded fragment.

FIG. 5 is a computer architecture diagram showing an exemplary computer architecture for a client access server or other computing device 500 capable of performing the functionality disclosed herein for generating a new erasure encoded fragment and/or verifying the integrity of the newly-generated fragment. The computer architecture shown illustrates a conventional server computer, workstation, desktop computer, laptop, network appliance, or other computing device, and may be utilized to execute any aspects of the software components presented herein described as executing within the computing device and/or other computing devices mentioned herein.

The computer 500 includes a baseboard, or "motherboard," which is a printed circuit board to which a multitude of components or devices may be connected by way of a system bus or other electrical communication paths. In one illustrative embodiment, one or more central processing units ("CPUs") 502 operate in conjunction with a chipset 504. The CPUs 502 are standard programmable processors that perform arithmetic and logical operations necessary for the operation of the computer 500.

The CPUs 502 perform the necessary operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 504 provides an interface between the CPUs 502 and the remainder of the components and devices on the baseboard. The chipset 504 may provide an interface to a random access memory ("RAM") 506, used as the main memory in the computer 500. The chipset 504 may further provide an interface to a computer-readable storage medium such as a read-only memory ("ROM") 508 or non-volatile RAM ("NVRAM") for storing basic routines that help or serve to start up the computer 500 and to transfer information between the various components and devices. The ROM 508 or NVRAM may also store other software components necessary for the operation of the computer 500 in accordance with the embodiments described herein.

The computer 500 may operate in a networked environment using logical connections to remote computing devices and computer systems through the network 25. The chipset 504 may include functionality for providing network connectivity through a network interface controller ("NIC") 510, such as a gigabit Ethernet adapter. The NIC 510 is capable of connecting the computer 500 to other computing devices over the network. It should be appreciated that multiple NICs 510 may be present in the computer 500, connecting the computer to multiple communication channels, such as but not limited to communication channels in the network, other types of networks, and remote computer systems.

The computer 500 may be connected to a mass storage device 512 that provides non-volatile storage for the computer. The mass storage device 512 may store system programs, application programs, other program modules and data, which have been described in greater detail herein. The mass storage device 512 may be connected to the computer 500 through a storage controller 514 connected to the chipset 504. The mass storage device 512 may consist of one or more physical storage units. The storage controller 514 may interface with the physical storage units through a serial attached SCSI ("SAS") interface, a serial advanced technology attachment ("SATA") interface, a fiber channel ("FC")

interface, or other type of interface for physically connecting and transferring data between computers and physical storage units.

The computer 500 may store data on the mass storage device 512 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 512 is characterized as primary or secondary storage and the like.

For example, the computer 500 may store information to the mass storage device 512 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 may further read information from the mass storage device 512 by detecting the physical states or characteristics of one or more particular locations within the physical storage units.

In addition to the mass storage device 512 described above, the computer 500 may have access to other computer-readable storage medium to store and retrieve information, such as program modules, data structures, or other data. It should be appreciated by those skilled in the art that computer-readable storage media can be any available media that provides for the storage of non-transitory data and that may be accessed by the computer 500. The term computer-storage media as used herein, however, does not encompass propagated signals per se.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 512 may store an operating system 516 utilized to control the operation of the computer 500. According to one embodiment, the operating system includes a member of the LINUX family of operating systems. According to another embodiment, the operating system includes a member of the WINDOWS® SERVER family of operating systems from MICROSOFT Corporation in Redmond, Wash. According to further embodiments, the operating system may include a member of the UNIX family of operating systems. It should be appreciated that other operating systems may also be utilized. The mass storage device 512 may store other system or application programs, modules, and/or data utilized by the computer 500 such as an erasure encoding and decoding module 520, a fragment generation module 522, and a data integrity check module 524. The erasure encoding and decoding module 520 contains instructions for erasure encoding a data file to produce erasure encoded fragments, and for decoding erasure encoded fragments to reconstruct the data file. The erasure encoding and decoding module 520 also contains information about which erasure encoding scheme is to be used, and the steps required to execute that scheme. The fragment generation module 522 contains instructions for generating fragments as disclosed herein. The data integrity check module 524 contains instructions for performing the operations disclosed herein to verify the integrity of a newly-generated fragment.

In one embodiment, the mass storage device 512 or other computer-readable storage media is encoded with computer-executable instructions that, when loaded into the computer 500, transform the computer from a general-purpose computing system into a special-purpose computer capable of implementing the embodiments described herein. These computer-executable instructions transform the computer 500 by specifying how the CPUs 502 transition between states, as described above. According to one embodiment, the computer 500 has access to computer-readable storage media storing computer-executable instructions which, when executed by the computer 500, perform aspects of one or more of the methods or procedures described herein.

The computer 500 may also include an input/output controller 518 for receiving and processing input from a number of input devices, such as a keyboard, a mouse, a touchpad, a touch screen, an electronic stylus, or other type of input device. Similarly, the input/output controller 518 may provide output to a display, such as a computer monitor, a flat-panel display, a digital projector, a printer, a plotter, or other type of output device. It will be appreciated that the computer 500 may not include all of the components shown herein, may include other components that are not explicitly shown herein, or may utilize an architecture completely different than that shown herein.

Although the exemplary computer architecture shown and discussed herein is directed to the client access server 20, this general architecture is also suited for the storage servers 30 and the client computer 10, the primary difference being the use of different modules or programs in the mass storage device 512 so as to provide for implementation of the different functions performed by the particular device.

Although the operation and implementation have been described herein in terms of logical operations, that is for convenience of illustration and discussion and other forms of operation and implementation may be used, such as but not limited to program modules which cause execution of the operations. Based on the foregoing, it should be appreciated that technologies for generating a new fragment, and for verifying the integrity of the newly-generated fragment, have been disclosed herein and that it may be possible to perform such generation and/or verification using variations of the processes described herein. Although the subject matter presented herein has been described in language specific to systems, methodological acts, and processes, it is to be understood that the concepts disclosed herein are not necessarily limited to the specific features, acts, or media described herein. Rather, the specific features, acts and mediums are disclosed as example forms.

The subject matter described herein is provided by way of illustration for the purposes of teaching, suggesting, and describing, and not limiting or restricting. Combinations and alternatives to the illustrated embodiments are contemplated, described herein, and set forth in the claims. Various modifications and changes may be made to the subject matter described herein without strictly following the embodiments and applications illustrated and described, and without departing from the scope of the following claims.

The invention claimed is:

1. A computer-implemented method to generate a specified erasure encoded fragment from a plurality of erasure encoded fragments without reconstructing a data file, the plurality of erasure encoded fragments being related to an erasure encoding scheme and the data file, the method comprising:
determining a specified erasure encoded fragment to be generated;
determining which erasure encoded fragments of the plurality of erasure encoded fragments are available, at one or more servers of a defined set of servers, and valid;
selecting erasure encoded fragments of the plurality of available and valid erasure encoded fragments to provide selected erasure encoded fragments;
generating a composite matrix based upon the erasure encoding scheme, the selected erasure encoded fragments, and the specified erasure encoded fragment; and
multiplying the composite matrix and the selected erasure encoded fragments to generate the specified erasure encoded fragment, wherein generating the specified erasure encoded fragment comprises:
at least one of (1) receiving, at a server of the defined set of servers, the composite matrix and a first identification of the erasure encoded fragments that correspond to a set of erasure encoded fragments available at the server, or (2) prior to generating the composite matrix, receiving, at the server, a second identification of the specified erasure encoded fragment and a third identification of the erasure encoded fragments that correspond to the set of erasure encoded fragments.

2. The computer-implemented method of claim 1, wherein multiplying the composite matrix and the selected erasure encoded fragments comprises:
generating a plurality of reduced composite matrices, a reduced composite matrix of the plurality of reduced composite matrices being generated by reducing the composite matrix to correspond to an erasure encoded fragment of the selected erasure encoded fragments;
multiplying each reduced composite matrix of the plurality of reduced composite matrices by the corresponding erasure encoded fragment of the selected erasure encoded fragments to generate a plurality of partial sums; and
summing the plurality of partial sums to generate the specified erasure encoded fragment.

3. The computer-implemented method of claim 1, wherein generating the composite matrix comprises:
generating a first erasure encoding matrix based upon the erasure encoding scheme and the erasure encoded fragments, the first erasure encoding matrix being an invertible, square matrix;
inverting the first erasure encoding matrix to generate an inverted first erasure encoding matrix;
generating a second erasure encoding matrix based upon the specified erasure encoded fragment; and
multiplying the inverted first erasure encoding matrix and the second erasure encoding matrix to generate the composite matrix.

4. The computer-implemented method of claim 3, wherein the first erasure encoding matrix is an erasure coding matrix based on the erasure encoding scheme that, applied to the data file, produces the erasure encoded fragments.

5. The computer-implemented method of claim 3, wherein the second erasure encoding matrix is an erasure coding matrix based on the erasure encoding scheme that, applied to the data file, produces only the specified erasure encoded fragment.

6. The computer-implemented method of claim 3, wherein generating the first erasure encoding matrix comprises:
obtaining or generating a third erasure encoding matrix corresponding to the erasure encoding scheme, the third erasure encoding matrix being an erasure coding matrix based on the erasure encoding scheme that, applied to the data file, produces the plurality of erasure encoded fragments; and
reducing the third erasure encoding matrix by removing rows or coefficients that do not correspond to the erasure encoded fragments.

7. The computer-implemented method of claim 1, further comprising:
assigning a first server to generate a first partial sum based on a first server composite matrix and a first set of the erasure encoded fragments, the first server composite matrix being the composite matrix reduced according to the first set of the erasure encoded fragments; and
assigning a second server to generate a second partial sum based on a second server composite matrix and a second set of the erasure encoded fragments, the second server composite matrix being the composite matrix reduced according to the second set of the erasure encoded fragments, the second set of the erasure encoded fragments not including any erasure encoded fragment of the first set of the erasure encoded fragments, neither the first set of the erasure encoded fragments nor the second set of the erasure encoded fragments including the specified erasure encoded fragment.

8. The computer-implemented method of claim 1, further comprising:
assigning a first server to generate a first partial sum based on a first server composite matrix and a first set of the erasure encoded fragments, the first server composite matrix being the composite matrix reduced according to the first set of the erasure encoded fragments;
assigning a second server to generate a second partial sum based on a second server composite matrix and a second set of the erasure encoded fragments, the second server composite matrix being the composite matrix reduced according to the second set of the erasure encoded fragments, the second set of the erasure encoded fragments not including any erasure encoded fragment of the first set of the erasure encoded fragments, neither the first set of the erasure encoded fragments nor the second set of the erasure encoded fragments including the specified erasure encoded fragment; and
assigning a third server to combine the first partial sum and the second partial sum.

9. The computer-implemented method of claim 1, further comprising:
assigning a first server to generate a first partial sum based on a first server composite matrix and a first set of the erasure encoded fragments, the first server composite matrix being the composite matrix reduced according to the first set of the erasure encoded fragments; and
assigning a second server to generate a second partial sum based on a second server composite matrix and a second set of the erasure encoded fragments, the second server composite matrix being the composite matrix reduced according to the second set of the erasure encoded fragments, the second set of the erasure encoded fragments not including any fragment of the first set of the erasure encoded fragments, neither the first set of the erasure encoded fragments nor the second set of the erasure encoded fragments including the specified erasure encoded fragment;

wherein assigning the second server to generate the second partial sum is based upon a consideration of reducing network traffic from at least one of the first server or the second server.

10. The computer-implemented method of claim 1, further comprising:

assigning a first server to generate a first partial sum based on a first server composite matrix and a first set of the erasure encoded fragments, the first server composite matrix being the composite matrix reduced according to the first set of the erasure encoded fragments; and assigning a second server to generate a second partial sum based on a second server composite matrix and a second set of the erasure encoded fragments, the second server composite matrix being the composite matrix reduced according to the second set of the erasure encoded fragments, the second set of the erasure encoded fragments not including any fragment of the first set of the erasure encoded fragments, neither the first set of the erasure encoded fragments nor the second set of the erasure encoded fragments including the specified erasure encoded fragment;

wherein assigning the second server to generate the second partial sum is based upon a consideration of reducing the computational workload of at least one of the first server or the second server.

11. A computer-readable storage medium having computer-executable instructions stored thereupon to generate a specified erasure encoded fragment from a plurality of erasure encoded fragments without reconstructing a data file, the plurality of erasure encoded fragments being related to an erasure coding scheme and the data file, the instructions, when executed by a computer, cause the computer to:

determine, at a first server of a plurality of servers, the specified erasure encoded fragment to be generated;

determine erasure encoded fragments of the plurality of erasure encoded fragments that are available and valid;

select erasure encoded fragments of the plurality of available and valid erasure encoded fragments that are to be used to generate the specified erasure encoded fragment;

generate a composite matrix based upon the erasure encoding scheme, the erasure encoded fragments, and the specified erasure encoded fragment;

generate partial sums by multiplying the composite matrix and the erasure encoded fragments; and generate, at the first server or a second server of the plurality of servers that is different from the first server, the specified erasure encoded fragment by at least one of (1) receiving and summing the partial sums at the first server or the second server or (2) receiving the partial sums and summing the partial sums with a partial sum generated by the first server or the second server.

12. The computer-readable storage medium of claim 11, wherein the instructions further cause the computer to:

generate a first erasure encoding matrix based upon the erasure encoding scheme and the erasure encoded fragments, the first erasure encoding matrix being an invertible, square matrix;

invert the first erasure encoding matrix to generate an inverted first erasure encoding matrix;

generate a second erasure encoding matrix based upon the erasure encoded fragments; and multiply the inverted first erasure encoding matrix and the second erasure encoding matrix to generate the composite matrix.

13. The computer-readable storage medium of claim 12, wherein the instructions to generate the first erasure encoding matrix further cause the computer to generate an erasure coding matrix based on the erasure encoding scheme that, applied to the data file, produces the erasure encoded fragments.

14. The computer-readable storage medium of claim 12, wherein the instructions to generate the second erasure encoding matrix further cause the computer to generate an erasure coding matrix based on the erasure encoding scheme that, applied to the data file, produces the specified erasure encoded fragment.

15. The computer-readable storage medium of claim 11, wherein the instructions to generate the first erasure encoding matrix further cause the computer to:

obtain or generate a third erasure encoding matrix corresponding to the erasure encoding scheme; and reduce the third erasure encoding matrix by removing rows or coefficients of the third erasure encoding matrix that do not correspond to the erasure encoded fragments.

16. The computer-readable storage medium of claim 15, wherein the instructions to obtain or generate a third erasure encoding matrix corresponding to the erasure encoding scheme further cause the computer to obtain or to generate an erasure coding matrix based on the erasure encoding scheme that, applied to the data file, produces the erasure encoded fragments.

17. The computer-readable storage medium of claim 11, wherein the instructions further cause the computer to:

assign the second server to generate a first partial sum based on the composite matrix and a first set of the erasure encoded fragments; and assign a third server of the plurality of servers to generate a second partial sum based on the composite matrix and a second set of the erasure encoded fragments, the second set of the erasure encoded fragments not including any erasure encoded fragment of the first set of the erasure encoded fragments, neither the first set of the erasure encoded fragments nor the second set of the erasure encoded fragments including the specified erasure encoded fragment.

18. The computer-readable storage medium of claim 11, wherein the instructions further cause the computer to:

assign the second server to generate a first partial sum based on the composite matrix and a first set of the erasure encoded fragments;

assign a third server to generate a second partial sum based on the composite matrix and a second set of the erasure encoded fragments, the second set of the erasure encoded fragments not including any erasure encoded fragment of the first set of the erasure encoded fragments, neither the first set of the erasure encoded fragments nor the second set of the erasure encoded fragments including the specified erasure encoded fragment; and assign the first server or the second server to combine the first partial sum and the second partial sum.

19. The computer-readable storage medium of claim 11, wherein the instructions further cause the computer to:
   determine a first set of the erasure encoded fragments that are locally available to the second server and a second set of the erasure encoded fragments that are locally available to a third server of the plurality of servers;
   determine network traffic from the second server and the third server based on the first set of the erasure encoded fragments and the second set of the erasure encoded fragments;
   assign the second server to generate a first partial sum based on the composite matrix and the first set of the erasure encoded fragments; and
   assign the third server to generate a second partial sum based on the composite matrix and the second set of the erasure encoded fragments, the second set of the erasure encoded fragments not including any erasure encoded fragment of the first set of the erasure encoded fragments, neither the first set of the erasure encoded fragments nor the second set of the erasure encoded fragments including the specified erasure encoded fragment;
   wherein the first set of the erasure encoded fragments and the second set of the erasure encoded fragments are assigned to reduce network traffic from at least one of the second server or the third server.

20. The computer-readable storage medium of claim 11, wherein the instructions further cause the computer to:
   determine a first set of the erasure encoded fragments that is locally available to the second server and a second set of the erasure encoded fragments that is locally available to a third server of the plurality of servers;
   determine a first computational workload for the second server and a second computational workload for the third server based upon the first set of the erasure encoded fragments and the second set of the erasure encoded fragments;
   assign the second server to generate a first partial sum based on the composite matrix and the first set of the erasure encoded fragments; and
   assign the third server to generate a second partial sum based on the composite matrix and the second set of the erasure encoded fragments, the second set of the erasure encoded fragments not including any erasure encoded fragment of the first set of the erasure encoded fragments, neither the first set of the erasure encoded fragments nor the second set of the erasure encoded fragments including the specified erasure encoded fragment;
   wherein assigning the second server or assigning the third server is based upon a consideration of reducing at least one of the first computational workload or the second computational workload.

21. The computer-readable storage medium of claim 11, wherein the instructions further cause the computer to at least one of:
   (a) store the specified erasure encoded fragment; or
   (b) transmit the specified erasure encoded fragment to a second computer.

22. The computer-readable storage medium of claim 11, wherein the instructions further cause the computer to:
   determine a plurality of sets of the erasure encoded fragments, each set of erasure encoded fragments including a different erasure encoded fragment, and each set of the erasure encoded fragments being locally available to one or more servers of the plurality of servers; and
   assign a summing server of the plurality of servers to generate a partial sum based on a set of the plurality of sets of the selected erasure encoded fragments that is locally available to the one or more servers.

23. A system to generate a specified erasure encoded fragment from a plurality of erasure encoded fragments without reconstructing a data file, the plurality of erasure encoded fragments being related to an erasure coding scheme and the data file, the system comprising:
   a first server, of a defined set of servers, to:
   either identify or receive a first identification of the specified erasure encoded fragment to be generated;
   either identify or receive a second identification of erasure encoded fragments selected to be used to generate the specified erasure encoded fragment;
   generate a composite matrix based upon the erasure encoding scheme, the erasure encoded fragments, and the specified erasure encoded fragment;
   generate the specified erasure encoded fragment based upon the composite matrix and the erasure encoded fragments;
   wherein one or more servers in the defined set of servers are to:
      at least one of (1) receive the composite matrix and the second identification of the erasure encoded fragments in a corresponding set of erasure encoded fragments for the one or more servers, or (2) receive the first identification of the specified erasure encoded fragment and the second identification of the erasure encoded fragments in the corresponding set of erasure encoded fragments for the one or more servers, and generate the composite matrix based upon the erasure encoding scheme, the erasure encoded fragments, and the specified fragment;
      retrieve the erasure encoded fragments identified in the corresponding set of erasure encoded fragments for the one or more servers,
      generate a partial sum based upon the composite matrix and the erasure encoded fragments retrieved for the one or more servers,
      send the partial sum to a generating server of the defined set of servers; and
   wherein the generating server is either (1) the first server or (2) a second server in the defined set of servers that is different from the first server, and wherein the generating server is to:
   receive the partial sums from the one or more servers, and at least one of (1) sum the partial sums to generate the specified erasure encoded fragment or (2) sum the partial sums with a partial sum generated by the generating server to generate the specified erasure encoded fragment.

24. The system of claim 23, wherein the system generates the composite matrix by:
   generating a first erasure encoding matrix based upon the erasure encoding scheme and the erasure encoded fragments, the first erasure encoding matrix being an invertible, square matrix;
   inverting the first erasure encoding matrix to generate an inverted first erasure encoding matrix;
   generating a second erasure encoding matrix based upon the erasure encoded fragment; and multiplying the inverted first erasure encoding matrix and the second erasure encoding matrix to generate the composite matrix.

25. The system of claim 23, wherein
the one or more servers are to:
either identify or receive the first identification of the specified erasure encoded fragment to be generated,
request and receive a third identification of erasure encoded fragments available from other servers of the defined set of servers,
based upon the third identification of the erasure encoded fragments available from the other servers, select erasure encoded fragments from the available erasure encoded fragments that are to be used to generate the specified erasure encoded fragment, define a set of servers of the other servers, and define a corresponding plurality of sets of erasure encoded fragments, each set of the corresponding plurality of sets of erasure encoded fragments not including any erasure encoded fragment included in another set of the corresponding plurality of sets of erasure encoded fragments, none of the sets of the corresponding plurality of sets of erasure encoded fragments including the specified erasure encoded fragment, each set of the corresponding plurality of sets of erasure encoded fragments having at least one of the erasure encoded fragments selected to be used to generate the specified erasure encoded fragment,
either (1) generate a composite matrix based upon the erasure encoding scheme, the erasure encoded fragments, and the specified erasure encoded fragment, and send, to each server in the set of servers of the other servers, the composite matrix and a fourth identification of the erasure encoded fragments in the corresponding set of erasure encoded fragments for each server in the set of servers of the other servers, or (2) send, to each server in the set of servers of the other servers, the first identification of the specified erasure encoded fragment and the fourth identification of the erasure encoded fragments in the corresponding set of fragments for that server; and
wherein each server in the set of servers of the other servers is to:
receive and respond to the request for the identification of the erasure encoded fragments available from that server.

26. The system of claim 25, wherein, to generate the partial sum based upon the composite matrix and the erasure encoded fragments, each server in the defined set of servers is to:
multiply the composite matrix and the erasure encoded fragments of the corresponding plurality of sets of erasure encoded fragments for each server to generate the partial sum.

27. A computer-implemented method to generate a specified erasure encoded fragment from a plurality of erasure encoded fragments without reconstructing a data file, the plurality of erasure encoded fragments being related to an erasure encoding scheme and the data file, the method comprising:
receiving, at one or more servers of a plurality of servers, at least one of (1) a first identification of a first erasure encoded fragment to be used to generate the specified erasure encoded fragment, the first identification corresponding to a second erasure encoded fragment at the one or more servers or (2) a second identification of the specified erasure encoded fragment;
generating a composite matrix based upon the erasure encoding scheme, the second erasure encoded fragment, and the specified erasure encoded fragment;
receiving the composite matrix or information identifying the composite matrix at a first server of the plurality of servers;
multiplying the composite matrix by the second erasure encoded fragment to generate a first partial sum; and
sending the first partial sum to a generating server that at least one of (1) sums the first partial sum with a second partial sum received at the generating server to generate the specified erasure encoded fragment or (2) sums the first partial sum with a third partial sum generated by the generating server to generate the specified erasure encoded fragment.

28. The computer-implemented method of claim 27, further comprising:
receiving a second identification of a plurality of selected erasure encoded fragments to be used to generate the specified erasure encoded fragment;
obtaining the plurality of the selected erasure encoded fragments;
multiplying the composite matrix by the plurality of the selected erasure encoded fragments to generate a plurality of partial sums; and
combining the plurality of partial sums with at least one of the first partial sum, the second partial sum, or the third partial sum to generate the specified erasure encoded fragment.

29. The computer-implemented method of claim 27, further comprising:
receiving a fourth partial sum; and
combining the first partial sum and the fourth partial sum to generate specified erasure encoded fragment.

30. The computer-implemented method of claim 27, wherein the composite matrix is based upon the first identification, and
after receiving the composite matrix the first identification, reducing the composite matrix to correspond to the first erasure encoded fragment, creating a reduced composite matrix,
wherein generating the partial sum comprises multiplying the reduced composite matrix and the first erasure encoded fragment.

31. The computer-implemented method of claim 27 wherein receiving information identifying the composite matrix comprises:
receiving the first identification;
generating a first erasure encoding matrix based upon the first identification and the erasure encoding scheme;
inverting the first erasure encoding matrix to generate an inverted first erasure encoding matrix;
generating a second erasure encoding matrix based upon the second identification; and
multiplying the inverted first erasure encoding matrix and the second erasure encoding matrix to generate the composite matrix.

32. A system for generating a specified erasure encoded fragment related to a data file without reconstructing the data file, the system comprising:
a first server of a plurality of servers that:
at least one of generates a first identification of the specified erasure encoded fragment to be generated, or receives the first identification;
determines a second identification of one or more erasure encoded fragments available from one or more other servers of the plurality of servers;

based at least partly on the second identification, selects a set of erasure encoded fragment from the one or more erasure encoded fragments, creating a selected erasure encoded fragment set distributed among the one or more other servers, the selected erasure encoded fragment set not including the specified erasure encoded fragment; and at least one of (1) generates a composite matrix based at least partly on the erasure encoding scheme, the selected erasure encoded fragment set, and the specified erasure encoded fragment, and sends, to the one or more other servers, the composite matrix, or (2) sends, to the one or more other servers, the first identification and a third identification of the selected erasure encoded fragment set;

wherein the one or more other servers:

at least one of (1) receives the composite matrix, or (2) receives the first identification and the third identification, and generates the composite matrix based at least partly on the erasure encoding scheme, the selected erasure encoded fragment set, and the specified erasure encoded fragment;

generates one or more partial sums based at least partly on the composite matrix and the selected erasure encoded fragment set; and sends the one or more partial sums to a generating server of the plurality of servers;

wherein the generating server:

receives the one or more partial sums, and at least one of (1) sums the one or more partial sums to generate the specified erasure encoded fragment or (2) sums the one or more partial sums to generate an intermediate partial sum, and sums the intermediate partial sum with a second partial sum generated by the generating server to generate the specified erasure encoded fragment.

33. The system of claim 32, wherein, prior to generating the one or more partial sums, a third server of the one or more other servers sends a first subset of the selected erasure encoded fragment set, stored at the third server, to a fourth server of the one or more other servers.

34. The system of claim 33, wherein the fourth server generates a collected fragment matrix from the first subset received from the third server and a second subset of the selected erasure encoded fragment set stored at the fourth server, and multiplies the collected fragment matrix with the composite matrix to generate a partial sum.

35. The system of claim 33, wherein sending the first subset is based at least partly on a consideration of reducing a computational workload of at least one server of the plurality of servers.

36. The system of claim 32, wherein, to generate the one or more partial sums, the one or more other servers:

multiplies the composite matrix with at least a portion of the selected erasure encoded fragment set.

37. The system of claim 32, wherein a third server of the one or more other servers generates a single partial sum and a fourth server of the one or more other servers generates multiple partial sums and combines the multiple partial sums to generate an intermediate partial sum.

38. The system of claim 32, wherein the one or more partial sums comprise one or more intermediate partial sums.

39. The system of claim 32, wherein generating the composite matrix comprises:

generating a first erasure encoding matrix based upon the erasure encoding scheme and the selected erasure encoded fragment set, the first erasure encoding matrix being an invertible, square matrix;

inverting the first erasure encoding matrix to generate an inverted first erasure encoding matrix;

generating a second erasure encoding matrix based upon the specified erasure encoded fragment; and multiplying the inverted first erasure encoding matrix and the second erasure encoding matrix.

40. The system of claim 39, wherein the first erasure encoding matrix is an erasure coding matrix based on the erasure encoding scheme that, applied to the data file, produces the selected erasure encoded fragment set.

41. The system of claim 39, wherein the second erasure encoding matrix is an erasure coding matrix based on the erasure encoding scheme that, applied to the data file, produces the specified erasure encoded fragment.

42. The system of claim 39, wherein generating the first erasure encoding matrix comprises:

obtaining or generating a third erasure encoding matrix corresponding to the erasure encoding scheme, the third erasure encoding matrix being an erasure coding matrix based on the erasure encoding scheme that, applied to the data file, produces the selected erasure encoded fragment set; and reducing the third erasure encoding matrix by removing rows or coefficients that do not correspond to the selected erasure encoded fragment set.

* * * * *